US008006248B2

United States Patent
Garza et al.

(10) Patent No.: US 8,006,248 B2
(45) Date of Patent: Aug. 23, 2011

(54) METHOD, APPARATUS AND COMPUTER PROGRAM FOR FACILITATING COMMUNICATION BETWEEN A CLIENT APPLICATION AND A SERVER APPLICATION

(75) Inventors: Jose Emir Garza, Richmond (GB); Stephen James Hobson, Hampton (GB); Steven Powell, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 1076 days.

(21) Appl. No.: 11/381,588

(22) Filed: May 4, 2006

(65) Prior Publication Data

US 2006/0259545 A1    Nov. 16, 2006

(30) Foreign Application Priority Data

May 14, 2005   (GB) .................................. 0509904.9

(51) Int. Cl.
*G06F 3/00*   (2006.01)
*G06F 9/44*   (2006.01)
*G06F 9/46*   (2006.01)
*G06F 13/00*  (2006.01)

(52) U.S. Cl. ...................................... 719/313

(58) Field of Classification Search ................. 719/313; 709/203
See application file for complete search history.

(56) References Cited

U.S. PATENT DOCUMENTS

| 5,822,543 | A | 10/1998 | Dunn et al. |
| 7,127,507 | B1* | 10/2006 | Clark et al. ................... 709/224 |
| 2003/0046230 | A1* | 3/2003 | Jacobs et al. .................... 705/42 |
| 2003/0185355 | A1* | 10/2003 | Stephenson et al. ........ 379/88.22 |
| 2003/0200212 | A1* | 10/2003 | Benson et al. ..................... 707/7 |
| 2003/0208597 | A1 | 11/2003 | Belgaied |

FOREIGN PATENT DOCUMENTS

EP    0767558 A1    4/1997

* cited by examiner

*Primary Examiner* — Lechi Truong
*Assistant Examiner* — Timothy A Mudrick
(74) *Attorney, Agent, or Firm* — Jeanine S. Ray-Yarletts; A. Bruce Clay

(57) ABSTRACT

Responsive to a client application initiating a synchronous communication with a server application by sending a request via an asynchronous communication manager, one or more checks are performed to identify a cause of any failure to provide a response to the client application satisfying synchronous communication criteria. The results of one or more checks are used to determine whether to back out any data updates performed by/on behalf of the server application in response to the request.

16 Claims, 5 Drawing Sheets

METHOD, APPARATUS AND COMPUTER PROGRAM FOR FACILITATING COMMUNICATION BETWEEN A CLIENT APPLICATION AND A SERVER APPLICATION

CROSS-REFERENCE TO RELATED APPLICATIONS

This application claims foreign priority benefits under 35 U.S.C. §119 to co-pending UK patent application number UK 050904.9 filed May 14, 2005 and is incorporated herein by reference.

FIELD OF THE INVENTION

The present invention relates to the field of asynchronous messaging, and more particularly to the use of such technology for pseudo conversational messaging.

BACKGROUND OF THE INVENTION

A number of different types of messaging communication models currently exist.
i) Synchronous messaging where a client sends a message to a server and requires a response before client processing proceeds. The client is unable to perform additional work until a response is received from the server,
ii) Asynchronous messaging where a client puts a request to a queue for background processing. The client can in the meantime process other work, safe in knowledge that a response will be received at some point.
iii) Pseudo Conversational Messaging where asynchronous messaging technology is used to send and receive messages but nevertheless, the client and server are expecting synchronous communication with one another, or any other differences between the client and server system capabilities.

The third model of communication is a common use of asynchronous messaging technology (for example IBM's WebSphere® MQ product). Note that this use of the words "client" and "server" refers to the logical relationship between the two computer systems and does not necessarily imply that the client computer system is using (for example) a WebSphere MQ client connection to a WebSphere MQ queue manager in the server computer system.

Typically, asynchronous messaging is chosen for reasons that include:
i) it provides simple interfaces to the programs running in the client system and the server system.
ii) It is available for a wide range of systems (computers, operating systems, and other software)
iii) It enables use of integration software (for example, IBM's WebSphere® Business Integration Message Broker)
iv) Many users prefer to use a single messaging technology so that they benefit from consistent operations and system management.

A pseudo-conversational messaging system is shown with reference to FIG. 1. Using pseudo-conversational asynchronous messaging, a client computer application 10 prepares a message (the request) and issues a PUT verb (step 1) to send the message to remote request queue 40. In accordance with asynchronous messaging practices client queue manager 70 first places the message on a local transmit (xmit) queue 20. The client queue manager then transmits the message from the local xmit queue 20 to server remote request queue 40, hosted on server queue manager 80 (step 2). Server application 30 issues a GET verb to retrieve the message (step 3), processes the message at step 4 (that is, performs the requested service), and PUTs a response message (step 5) to send the response message to the reply to queue 60 specified in the request message. The server queue manager first places the response message on its xmit queue 50 and then transmits the message to the client's local reply-to queue 60 (step 6). The client application 10 issues a GET verb to get the response message (step 7).

The server application uses transactional semantics so that the GET of the request, the processing, and the PUT of the response are either all completed (COMMIT) or are all backed out (BACKOUT or ABORT).

The client application however cannot simply include its PUT of the request (step 1) and its get of the response (step 7) in the same transaction. This is because the request message is not delivered to the server queue manager until the transaction that contains it COMMITS. The client application would lock-up indefinitely waiting for a response from the server before committing its transaction, yet the server application would not have received a request to process because the transaction had not committed.

The difficulty including steps 1 and 7 together in a transaction creates a problem for the client application regarding the appropriate behavior when no response message from the server application has been received within a reasonable period of time. This is particularly true because this model of messaging is pseudo-conversational (synchronous), rather than being true asynchronous messaging.

Thus when the client application does not receive a response from the server application, the client application is unsure as to whether its request has been/or will be processed by the server application.

Numerous techniques have been devised to deal with this problem. For example, the client application can specify a time-out value with the request. In this case, the message will be discarded if it cannot be delivered to the server application before the time expires. However, even in this case, the client application cannot assume that "no response" means the requested function was not performed. It might be that the response message from the server application has been delayed by, for example, network problems.

The client application could alternatively decide, having heard nothing, that the processing worked. Such an assumption could however be incorrect. It rather depends how important the client application's request was as to how much an incorrect assumption matters.

A compensating transaction can be used to compensate for the situation where it is wrongly assumed that a previous transaction did or did not happen. The compensating transaction negates the effects of the wrong assumption. It is however generally difficult for a program to generate a compensating transaction automatically.

Another option is to periodically poll (e.g. after a timeout period) the client application queue manager (which can in turn poll the server application's queue manager). This however adds additional (typically unwanted) complexity to the client application.

SUMMARY OF THE INVENTION

According to a first aspect, there is provided a method for facilitating communication between a client application and a server application, the method comprising: responsive to the client application initiating a synchronous communication with the server application by sending the request via an asynchronous communication manager, performing one or more checks to identify a cause of any failure to provide a response to the client application satisfying synchronous communication criteria; and using the results of one or more of the checks to determine whether to back out any data updates(changes) performed by/on behalf of the server application in response to the client application's request.

Preferably the checks comprise checking each of a set of resources and a sequence of resource updates required to provide a response to the client application. Note, only one or more of a possible set of checks may be performed. By way of example, a resource may be a queue, a communications link etc. By way of example a resource update may involve putting a message to a queue, getting a message from a queue etc The asynchronous communication manager may comprise a client application's queue manager and a server application's queue manager.

According to a preferred embodiment, the server application's queue manager forwards the server application's response to the client application's request for receipt by the client application. In response to successful delivery of the response to the client application, the client application's queue manager informs the server application's queue manager that it is acceptable to finalize any changes by the client application's request with one or more resources.

Preferably the aforementioned one or more checks comprises at least one of:
i) checking at the client application's queue manager that the request message is appropriately specified,
ii) checking that a communication's link to the server application's queue manager is working,
iii) checking that a request queue, hosted by the server application's queue manger, is able to receive the client application's request;
iv) checking that the request is retrieved by the server application;
v) checking that a response is put to transmit queue hosted by the server application's queue manager;
vi) checking that the communication's link to the client application's queue manager is working;
vii) checking that a reply to queue, hosted by the client application's queue manager, is able to receive the response; and
viii) checking that the client application retrieves the server application's response from the reply to queue.

Preferably if it is determined that the request queue is unable to accept the client application's request, a notification is created for administrator attention.

Preferably if it is determined that the request is not retrieved by the server application (e.g. within a predetermined time period), a notification is created for administrator attention.

In accordance with a preferred embodiment, the server application's queue manager requests that any resource managers involved in processing the client application's request guarantee that they are able to finalize any changes necessitated by the client application's request.

If this is not possible, the server application's queue manager preferably requests that the resource managers undo any changes made on behalf of the server application.

Preferably, responsive to any such resource managers being able to make such a guarantee, it is logged that a response is to be sent to the client application's queue manager.

Preferably the server application is provided with a predetermined amount of time in which to retrieve the client application's request from the server application's queue manager.

Preferably the client application is provided with a predetermined amount of time in which to retrieve the server application's response from the client application's queue manager.

In accordance with a preferred embodiment, while waiting for an indication from the client application's queue manager of successful delivery of the server application's response, the server application's queue manager checks that the communication's link between the client application's queue manager and the server application's queue manager is working. Responsive to determining that the communication's link is not working, any changes necessitated by the client application's request are preferably finalized with one or more resources. A notification that an error may have occurred can be provided for administrator attention. Heartbeating technology is preferably used to determine whether the communication's link is working.

In the situation where the server application's queue manager has failed subsequent to sending a response to the client application's request, but prior to confirmation of delivery of the response to the client application, the situation is preferably as follows. Upon restart of the server application's queue manager and responsive to detecting logged information that a response was sent, any changes necessitated by the client application's request are preferably finalized with one or more resources, A notification that an error may have occurred is preferably provided for administrator attention.

In the situation where the server application's queue manager has failed prior to sending a response to the client application's request, the situation is preferably as follows. Upon restart of the server application's queue manager and responsive to detecting that there is no logged information that a response was sent, it is preferably requested that the server application undo any changes necessitated by the request and abort processing.

In accordance with a preferred embodiment the client application's request is only transmitted from the client application's queue manager to the server application's queue manager, when the client application attempts to retrieve the server application's response.

According to a second aspect, there is provided an apparatus for facilitating Communication between a client application and a server application, the apparatus comprising; means, responsive to the client application initiating a synchronous communication with the server application by sending the request via an asynchronous communication manager, for performing one or more checks to identify a cause of any failure to provide a response to the client application satisfying synchronous communication criteria; and means for using the results of one or more of the checks to determine whether to back out any data updates performed by/on behalf of the server application in response to the request.

The invention may be implemented in computer software.

According to one embodiment, the invention provides a method for a client application to communicate synchronously with a server application using asynchronous messaging software, the method comprising; receiving a client application request at the client application's queue manager for processing by the server application, if possible, forwarding the request to the server application's queue manager for retrieval by the server application, if possible, forwarding a response from the server application to the client application's queue manager for retrieval by the client application; performing checks to determine when the client application's request or the server application's response is unable to reach its intended recipient synchronously; and responsive to determining that they request or response is unable to reach its intended recipient, undoing any processing by the server application as a result of the client application's request.

BRIEF DESCRIPTION OF THE DRAWINGS

A preferred embodiment of the present invention will now be described, byway of example only, and with reference to the following drawings.

DETAILED DESCRIPTION OF THE INVENTION

Figure 1:
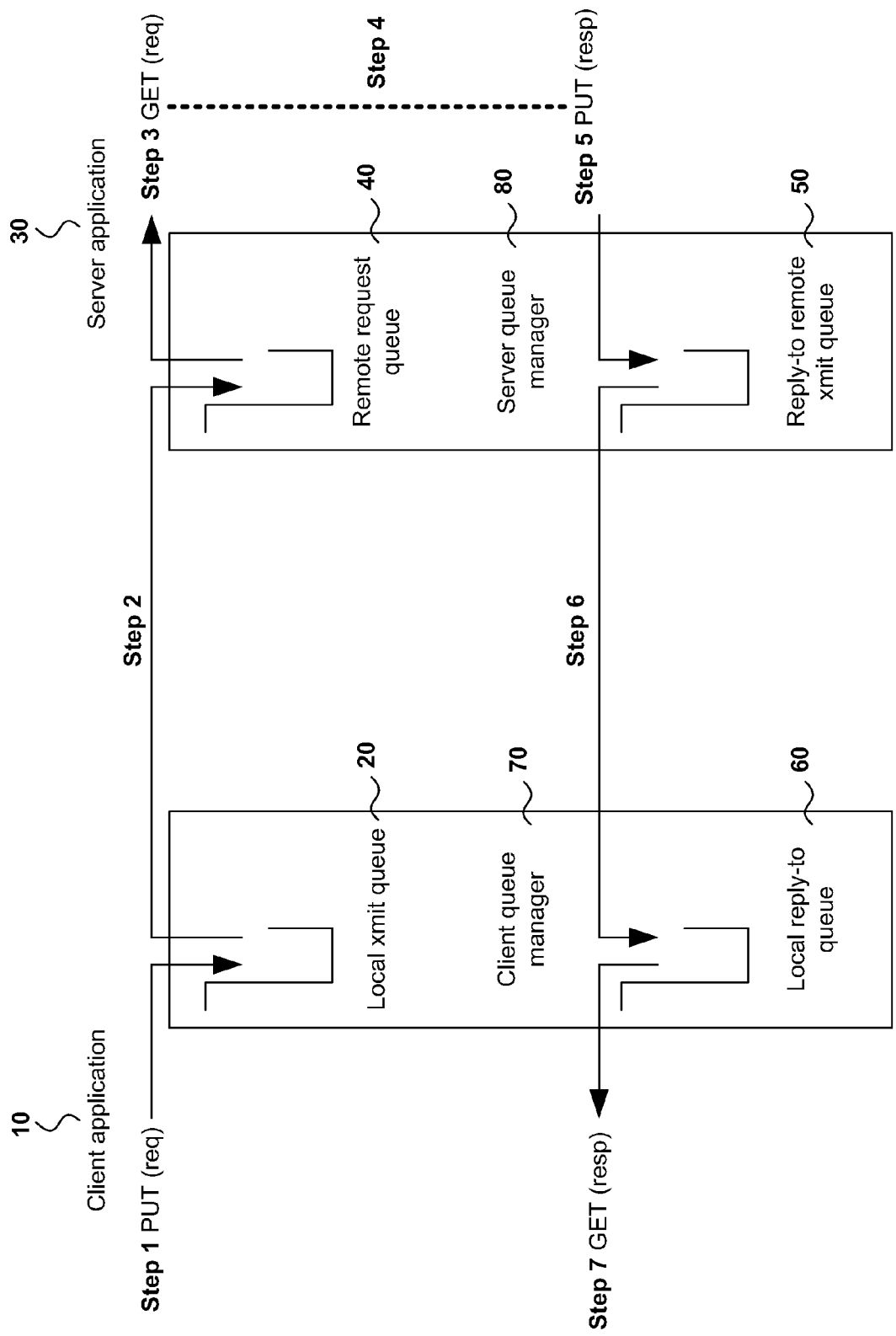
FIG. 1 illustrates the components and processing steps involved in a pseudo-conversational messaging system.

As discussed pseudo-conversational messaging suffers from the "no-response problem." In other words, a client application receiving no response from a request, is left wondering whether the request was processed/will be processed by a server application. There are a number of possibilities.

i) It could be that the request never reached the server application/queue manager in the first place;
ii) The server application/queue manager could just be processing requests particularly slowly;
iii) The server application/queue manager might have failed; or
iv) The server application's response might be delayed reaching the client application.

The client application is therefore left in an uncertain situation.

This invention, in accordance with a preferred embodiment, seeks to resolve such uncertainty by introducing novel processing into the client and server queue managers (messaging software) such that the client application can be developed without the use of complex code to handle the no-response-received case.

The client application is able to assume that if no response message is received within a reasonable time (preferably chosen by the client application) then the requested service has not been (and will not be) performed. The special processing includes provision for notifying an administrator in certain (very rare) cases where this assumption fails. The administrator is required to deal with these cases in much the same way as when a messaging system puts an undeliverable message on the so-called "dead letter queue" for administrative attention (IBM WebSphere MQ product).

Note for the sake of clarity, processing is described using the assumption that the servers queue manager is acting as the transaction coordinator for the server. It is also assumed that the client application does its PUTs and GETs out of transaction.

The behavior of the present invention may be specified in one of a number of ways:

1) an extra option is provided that the client application specifies at PUT time (this requires modification to existing applications)
2) an attribute is added to a remote queue definition. E.g. the client queue manager can create a definition of a remote queue such as the request queue and can then inform the server application's queue manager that the behavior of the invention is required. Alternatively, the server application's queue manager can also define an attribute on its own local request queue.
3) an attribute is added on the client application (this is set by an administrator when deploying/installing the application)

Options which do not require changes to existing client or server application code (i.e. only requiring changes to the messaging software itself) are particularly advantageous.

On the other hand, some customers might want existing client applications to carry on working the way they always have. Such customers might prefer the flexibility of having the client application specify whether they want the "old" behavior (i.e. not use the functionality disclosed) or the "new" behavior (i.e. use the disclosed functionality). This would imply a new option that the client application could invoke.

In one embodiment, both of the above approaches are catered for (queue attribute and client option).

Figure 2A:
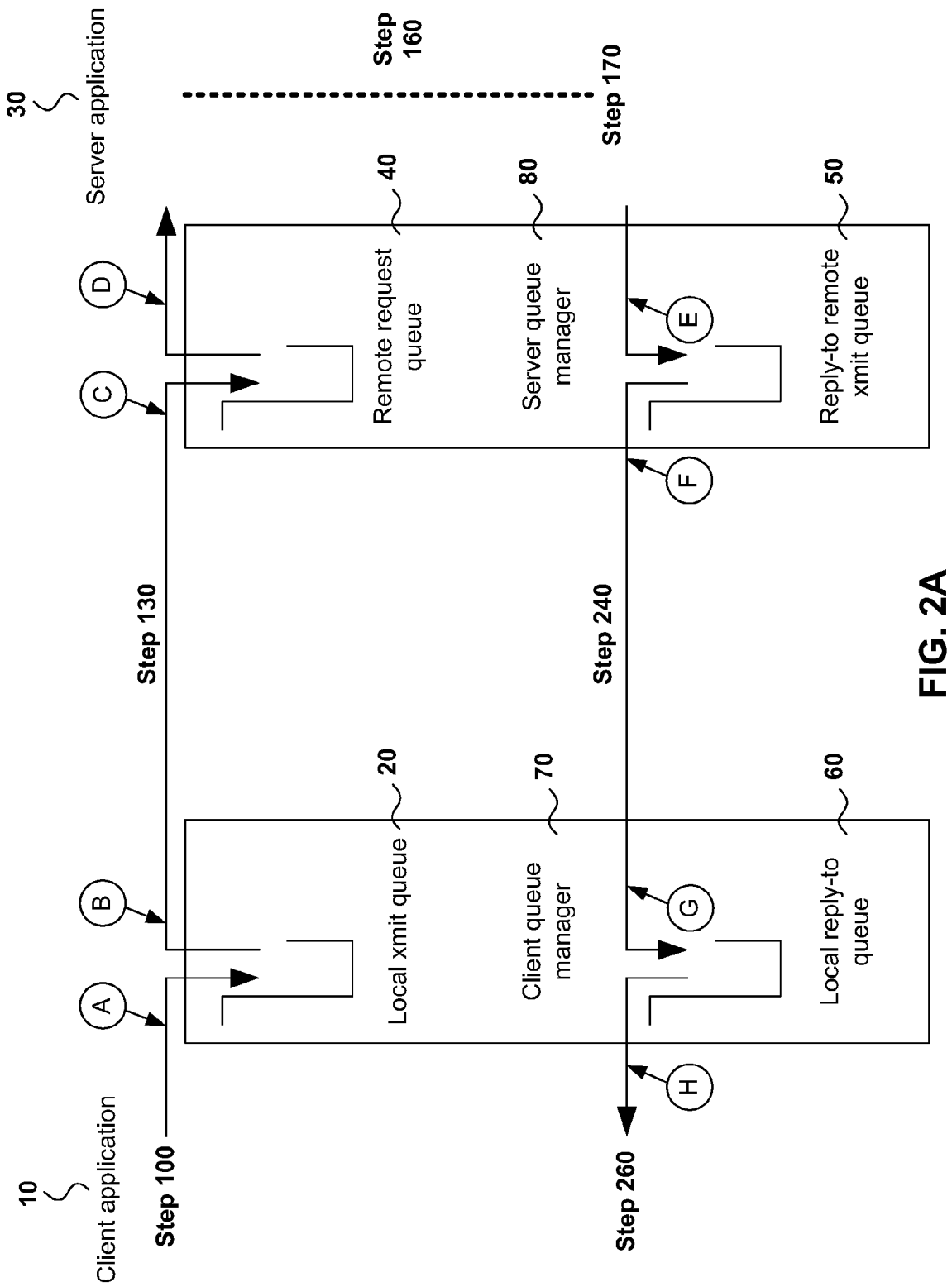
FIGS. 2a, 2b, 2c and 2d disclose the components and processing involved in a preferred embodiment of the present invention.
Figure 2B:
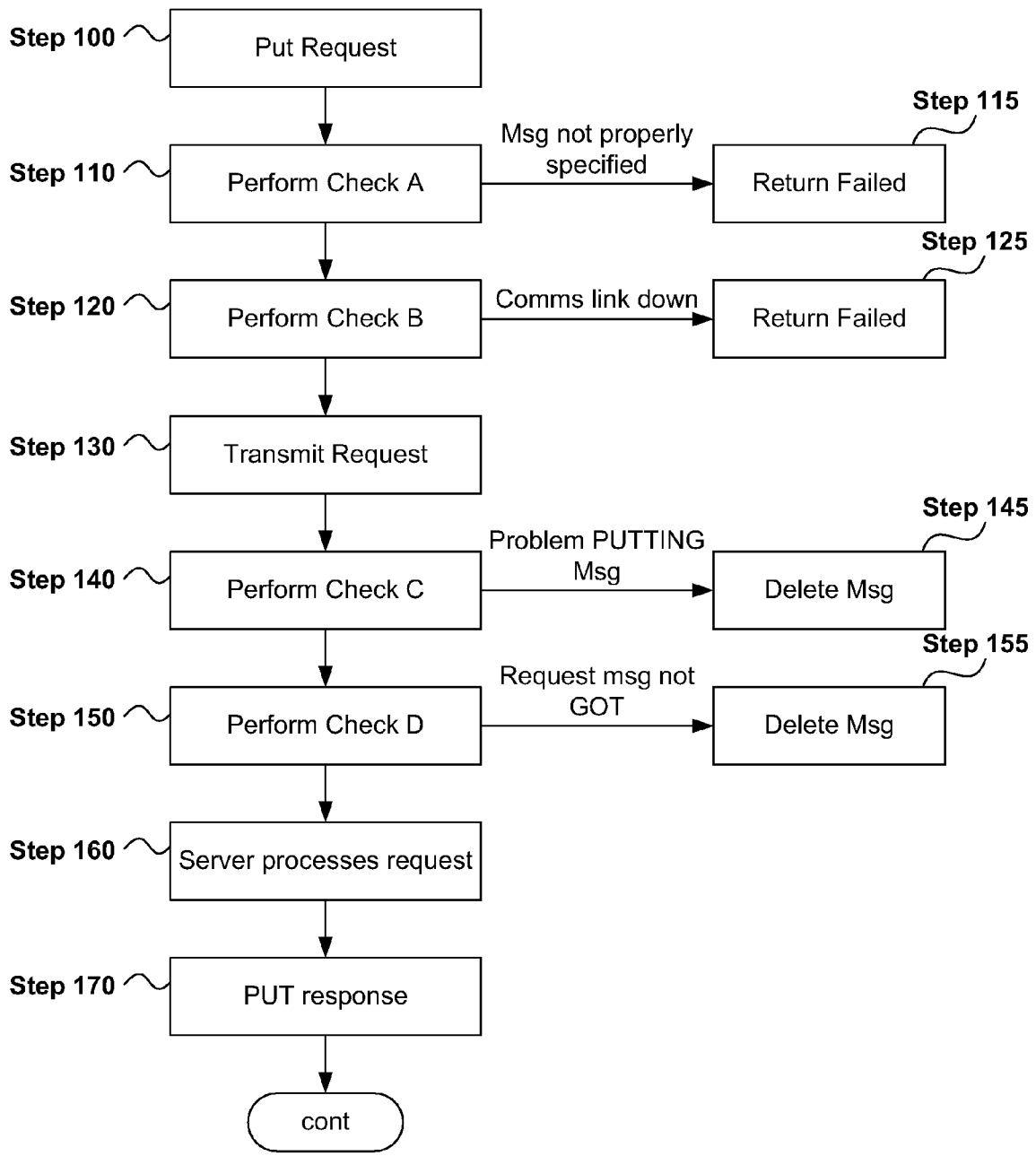
Figure 2C:
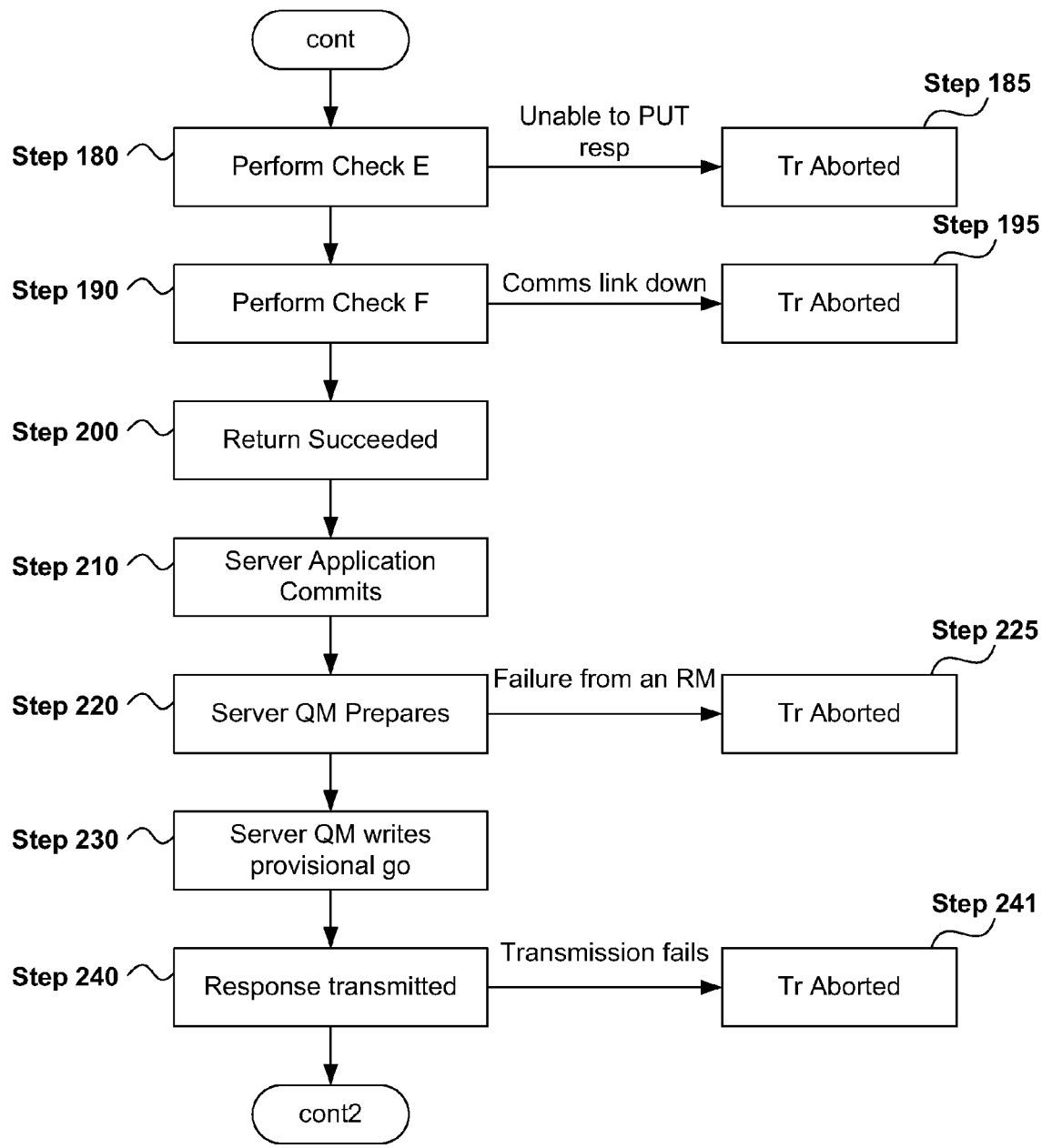
Figure 2D:
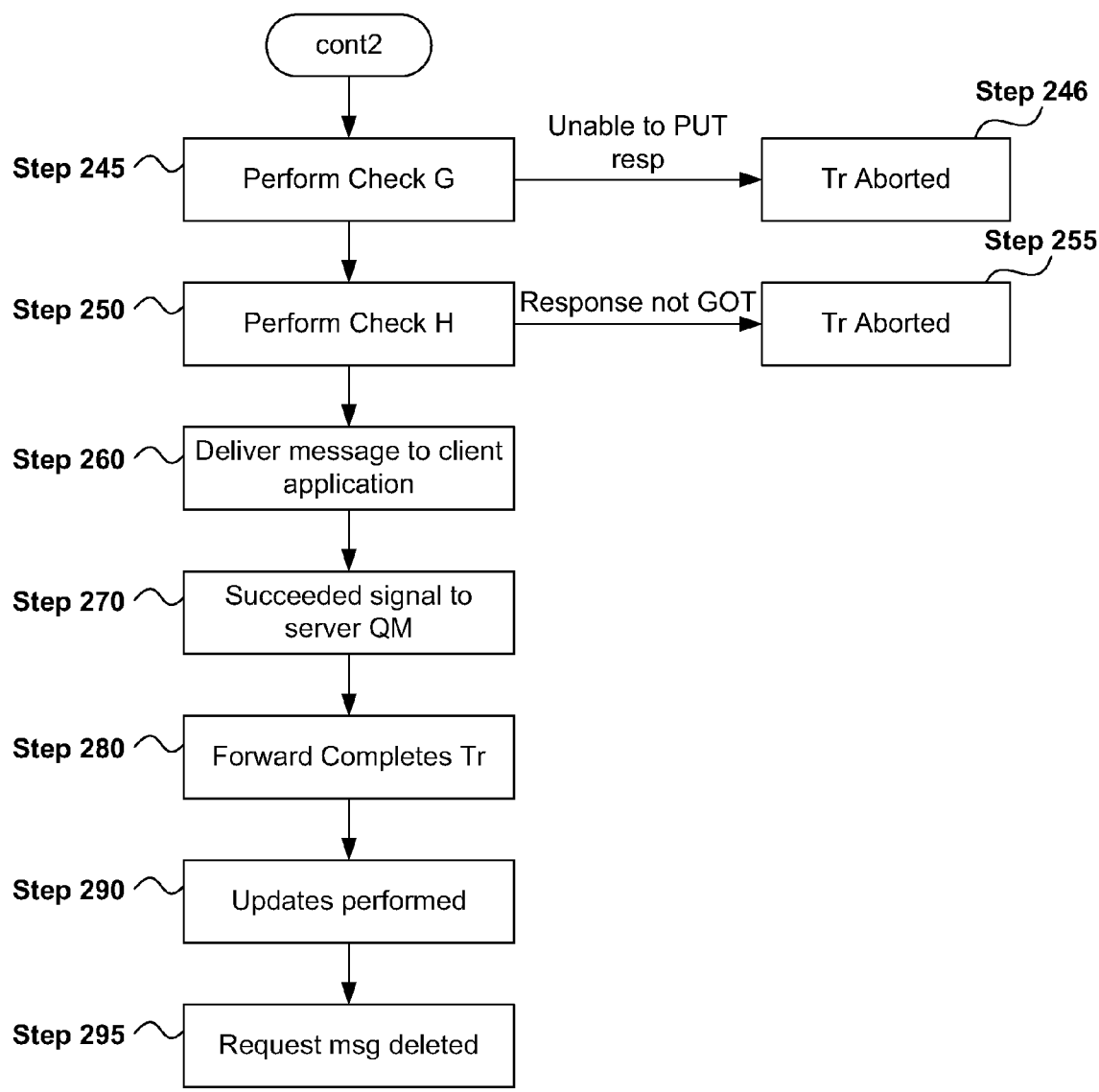

The preferred embodiment will now be described with reference to FIGS. 2a, 2b, 2c and 2d. FIG. 2a is similar to FIG. 1. The componentry is the same, as are the reference numerals identifying such componentry. Some additional information is provided relating to certain checks that are performed. These checks are detailed on FIG. 2a. Additional processing steps are illustrated in FIGS. 2b, 2c and 2d. The figures should all be read in conjunction with one another.

As alluded to above, the messaging software has a number of checks to perform. The first set of checks are used so that the client application can be sure that its request actually reached the server's queue manager. All checks will be described as and when they occur during processing, Client application 10 PUTs a request to client queue managers 70 local xmit queue 20 (step 100). Client queue manager 70, at this point, performs check A (step 110 in FIG. 2b).

Check A

Client's queue manager 70 checks that the message is appropriately specified. For example, the message should specify a reply-to queue 60 to accommodate the server application's response.

If the message is not appropriately specified, the client's queue manager returns "failed" to the client application for the PUT request (step 115). Consequently the request will not be forwarded on to the server application's queue manager and the client application can safely assume that its request has not and will not be processed by the server application.

Otherwise check B is performed (step 120).

Check B

The client's queue manager 70 checks if the communication link to server queue manager 80 is available.

If the link is not available, the client queue manager returns "failed" to client application 10 for the PUT request (step 125). Once again the request will not be forwarded to the server application's queue manager, and so the client application can safely assume that its request has not and will not be processed by the server application.

Note, normal asynchronous behavior is if the communications link is down, a client application's request will remain on the client queue managers xmit queue until the link is up again. However in this instance, such behavior is not appropriate since the client application is waiting for a response to the client's request—in other words the client application is employing a pseudo conversational (or synchronous) communications model.

Assuming that the communication's link is up, the client's queue manager 70 transmits the request message from the client's local xmit queue 20 to the servers queue manager 80 (step 130).

When the request is received by the server queue manager 80, the queue manager performs check C (step 140).

Check C

The server's queue manager 80 verifies if there is any reason why the request message cannot be added to the servers remote request queue 40 immediately. For example, the message may be too large, the queue 40 may be full; the queue may be PUT inhibited.

If there is any reason why the server's queue manager cannot accept the client's request, the servers queue manager deletes the request message (step 145). Consequently the server application will not process the client application's request.

Optionally, the servers queue manager can send a report or other notification for retrieval by an administrator (not shown). This could be written, for example, to a dead letter queue.

Assuming the request is accepted, the server queue manager 80 then performs check D (step 150).

Check D

A check is performed to determine whether a server application 30 performed a GET (step 150) to retrieve the request message within a configurable (but preferably short amount of time).

If the server application fails to perform the GET in time, or (in a simple embodiment) if the server application backs out the GET, the server's queue manager deletes the request message (step 155). In a more sophisticated embodiment, if the server application backs out the GET, the server's queue manager can permit some retries, Thus, if the server backs out the GET, the servers queue manager returns the request message to the request queue so that the server application can try again. However, after a specified number of retry attempts and/or after a specified amount of time doing these retries, the servers queue manager preferably deletes the message (to avoid an infinite retry loop). Optionally, the server's queue manager can send a report or other notification for retrieval by an administrator. This could be written to, for example, a "dead letter queue."

Note, it is not essential that the server application be given x seconds (or milliseconds) in which to GET the client application's request but this is preferable since (as discussed above) the GET may not work property. If the server application is slow to GET the request (or does not GET the request at all), then the client application will get bored and give up waiting for the response. When (if) the server application does eventually GET and process the request, then check H, which shall be subsequently discussed in greater detail, will fail (no client application GET for the response) and step 255 (see FIG. 2d) will ABORT the server application's transaction. Thus, there is no harm done, but the server application has wasted time and energy processing the request too late.

Note, it is optional for the server queue manager to send a report or other notification (as a result of checks C and D) because the client application is configured to interpret "no reply" as meaning that the requested action was not performed. This is the correct interpretation in the cases mentioned, However, a report or other notification could provide the administrator with useful additional information (e.g. that a request has failed and why it failed).

Assuming that the request message is retrieved (GOT) by the server application 30, server application 30 processes the request (step 160) and PUTS a response to server queue managers reply to remote xmit queue 50 (step 170). Note, if check C or D results in request deletion then no processing will be performed by the server application as a result of the client application's request.

A second set of checks are performed so that the client can be sure that the server application's response, if sent, is received. Again, such checks are depicted using the figures (starting with FIG. 2c).

Server queue manager 80 performs one such check—check E (step 180)

Check E

A check is performed by the server's queue manager to determine whether there is any reason why the server application's response cannot be PUT to xmit queue 50.

If the server queue manager is unable to PUT the response, failure is returned. Such a failure will cause the server application to back out its transaction, and, consequently, the server application will not perform any processing as a result of the client application's request (step 185).

If on the other hand, it is possible to PUT the response, check F is then performed (step 190).

Check F

The servers queue manager checks if the communication link to the client system is available.

If not, it returns "failed" to the PUT request. Such a failure will cause the server to back out its transaction, and, consequently the server application will not perform any processing as a result of the client application's request (step 195).

Otherwise, server queue manager 80 returns "succeeded" to the PUT request (step 200).

A response of "succeeded" causes the server queue manager to proceed and (assuming no other problems are identified by the server application), it is expected that the server application will commit (not a commit in the true sense of the word—see below) its transaction (step 210), The server's queue manager (acting as transaction coordinator) then issues a PREPARE against all resource managers (RMs) other than the queue manager itself (this is as per "last agent optimization") at step 220. Such a PREPARE causes all the RMs to "harden" (typically "harden" means "write out to their log") enough information to ensure they will be able to complete (or back out) their part of the transaction when asked to do so by the transaction coordinator (in this case, the server queue manager). (Resource managers may include, for example, database managers controlling databases against which changes may be made as a result of the client application's request (server application processing)).

If any RM returns "failed" then the servers queue manager ABORTS the transaction and the server queue manager (and any other RMs) back-out (step 225).

Otherwise, the server's queue manager writes a "provisional go" record for the transaction to its log (step 230). The "provisional go" is the server queue manager's way of logging that the servers queue manager is about to send a response to the client application's request, Such a provisional go record is useful for error recovery purposes. This will be explained later.

The servers queue manager then transmits the response message to the client's queue manager 70 at step 240. In conventional asynchronous messaging, the server's queue manager does not transmit the response message until commit processing for the server application is complete. At this stage, the server application's commit has been prepared but is not yet complete (and, as discussed below, might still get aborted).

In other words the server application's commit at step 210 is not a commit in the true sense of the word. The server application's commit asks the transaction coordinator to ask the RMs to commit (conventional 2PC). The transaction coordinator (in this case, the server queue manager) PREPARES all RMs (conventional, phase 1), it writes a "provisional go" record to its log (not shown) and sends the server application's response to the client's queue manager, It does not precipitate any updates (other changes) to be COMMITTED to back-end databases etc. Normally the transactional COMMIT would also cause such changes to be made with back-end systems.

Eventually the transaction coordinator decides everything is OK and forward completes at step 280 or decides everything is not OK and aborts (conventional, phase 2) at step 225 or step 246 or 255. This is all discussed below, Returning to the sequence of processing in FIG. 2c, if the transmission fails at step 240—for example, if the communication link is not available—the server's queue manager (acting as transaction coordinator) ABORTS the server application's transaction (step 241). Otherwise, it awaits a response.

Note, check F has already been performed at step 190 but the communications link may fail subsequently (i.e. in between returning an indication of success to the server application (step 200) and the actual attempt to transmit a response (step 240). For example, the server application may be told that the link is working, do some processing and then commit the transaction. The link may fail between the additional processing and the server applcation's commit.

Assuming that the transmission at step 240 worked and the response is received by the client queue manager 70, then queue manager 70 performs check G (step 245).

Check G

The client queue manager performs check G in order to determine whether it is possible to PUT the response onto local reply to queue 60, If it is not possible, a response of failed is returned to the server queue manager and this causes it to abort the server application's transaction (step 246).

Otherwise, check H is performed (step 250)

Check H

Client's queue manager checks whether the client application GETs the response message within a configurable (but short) amount of time. If the client application does not GET the response(s) within this time, the client's queue manager deletes the response message(s) and sends a "failed" signal to the servers queue manager. The server's queue manager (acting as transaction coordinator) ABORTS the server application's transaction (step 255).

Otherwise, the clients queue manager delivers the message (step 260) and sends a "succeeded" signal to the server's queue manager 80 (step 270). The server's queue manager (acting as transaction coordinator) "forward completes" the server application's transaction (step 280). By providing the client application with x seconds (or milliseconds) in which to GET the server application's response, the amount of time that the server application's transaction is in-doubt is minimized.

It will be appreciated that it is possible for the GET to fail, For example, the GET could timeout or the message may be too large for the client application to accept. If the GET does fail, step 255 should be processed as soon as possible to back-out the server applications transaction.

Note, the server queue manager can force transaction abort at step 255 (check H). Unlike the situation described with reference to check D, there is no point in allowing retries for this case since the client application is obviously not available. Thus, the queue manager could permit some retries for "ordinary" back-out or abort situations but not permit retries (i.e. delete the request message) for aborts which it itself forced at step 255. Thus in this situation a back-out/abort does not result in the client application's request being put back on the request queue 40. Note, the client queue manager would have to provide an indication of the reason for failure—i.e. that it was as a result of check H.

From the foregoing, it should now be appreciated that client application's GET of the server's response is made part of the server application's transaction. The server queue manager (acting as transaction coordinator) "forward completes" the server application's transaction once the client queue manager has confirmed receipt by the client application of the server application's response, Otherwise the server queue manager will abort the transaction. In this way the client application can be sure that either it will receive a response from the server queue manager or the transaction will be aborted.

Once the server queue manager "forward completes" the transaction, back-end databases etc. are updated (finalized) in accordance with the client application's request (step 290) and the request message is finally deleted off the request queue 40 (step 295).

It is apparent that the server application's transaction is in-doubt from when the response message is transmitted (step 240) until the status signal ("failed" or "succeeded") is received from the client's queue manager (step 270).

In conventional transaction processing, the transaction would remain in-doubt until the client's queue manager definitively reports its outcome. However it is understood that a long in-doubt state is highly undesirable in high performance servers For example, database and other locks are held until the transaction is resolved, creating log-jams in the server (e.g. server queue manager, resource managers, resources, server application).

Such a problem is resolved in the following novel way:

i) If after step 240, but before step 270, the servers queue manager 80 detects that the link to the client's queue manager 70 has failed or that the client queue manager has failed, then (acting as transaction coordinator) it COMMITS the transaction.

(The server queue manager knows whether it sent the response and whether the communications link was up at the time due to the response at step 240.)

Before indicating that participating RMs should also "forward complete", the server's queue manager creates and hardens a "commit possibly not notified" report for an administrator who must investigate and take action as appropriate.

This processing is analogous to the established WebSphere MO dead-letter queue concept. When a WebSphere MO messaging system is contracted (transactionally) to deliver a message but later discovers it cannot do so then it puts the message on the dead-letter queue for administrative attention.

It is desirable (but not absolutely essential) that the messaging software uses keep-alive or other heart-beat techniques to ensure timely detection of link or client queue manager failures. In the absence of such heart-beat technology, the servers queue manager waits a configurable (but short) time for a reply before assuming that the link or client queue manager has failed ii) if the servers queue manager 80 fails before it receives notification (success or failure) from the client's queue manager, then it can detect what has happened because of the "provisional go" record on its log (see earlier). In other words, the server's queue manager is aware that a response was sent to the client's queue manager as a result of the provisional go record.

Note, the phase 2 (forward commit or abort) decision is made by the transaction coordinator and it (the coordinator) writes its decision to its log.

If the log contains a "provisional go" but no phase 2 decision then the server queue manager can deduce that the transaction has not yet been forward completed, This is discovered when the server queue manager reads back its log at restart and the server queue manager then hardens a "commit possibly not notified", and makes the forward complete decision (strictly: writes a "forward complete" phase 2 decision to its log), and tells the RMs to forward complete, If there is a phase 2 decision on the log then the server queue manager knows that the transaction has already been forward completed.

To clarify, the exact sequence of the preferred embodiment is:
1. The coordinator (server queue manager) instructs all RMs to PREPARE
2. The coordinator receives "OK" from all the RMs
3. The coordinator writes a "provisional go" to its log (indicating that it is about to send a response to the client's queue manager)
4. The coordinator sends a response to client end and awaits confirmation from client's queue manager
5. Confirmation arrives at the coordinator who decides to "forward complete"
6. The coordinator writes the "forward complete" phase 2 decision to its log
7. The coordinator tells all RMs to forward complete.

The RMs are in-doubt from when they do their prepare OK until they hear the coordinators final decision. Under all circumstances, when they do hear the coordinators final decision they hear the decision that has been written to the coordinators log.

If the coordinator fails at steps 4 or 5 then it can't tell by looking at its log whether it sent the response (might have failed in 4) or whether the client end confirmed receipt (might have failed in 5).

At this stage the coordinator is in-doubt. This is not allowed. The coordinator must therefore make a decision. It reasons thus:
If the client application did get the response then, the server queue manager is morally obliged to forward complete—i.e. the client application must be able to assume that if a response is received, the server application's processing WILL be finalized.
If the client application fell over then forward complete is not prohibited
So the server queue manager forward completes,
Then to be on the safe side, a "commit possibly not notified" report is created. This is because there is a small chance that the client application is unaware that the server application actually processed its request. The report could be written to a dead letter queue or similar.

At restart (assuming a response was sent), the server's queue manager 80 creates the "commit possibly not notified" report and forward completes the transaction.

Otherwise (if no "provisional go" record exists), the servers queue manager aborts the transaction.

Observe that:
if the client application receives its response, it can safely assume that the transaction has been (or will be) forward completed. "Safely" here is the same as with traditional distributed two-phase commit (2PC) transactionality (but does not incur the overheads of, or the risk of long in-doubts from, distributed 2PC).

If the client application does not receive its response—that is, its GET for the response message fails—it can safely assume that either the transaction never started or the transaction has been (or will be) backed out.

"Safely" here is less safe than with traditional distributed 2PC but is essentially the same as with the "assured one time delivery" of established messaging systems—that is, exceptions are rare and handling the exception cases is not the responsibility of the client application.

To be clear, the only exceptions arise when:
i) The server fails after writing a "provisional go" record to its log but before sending the response message; or
ii) The servers queue manager succeeds in sending the response message but the communication link fails to deliver the response message to the client application's queue manager. The chances of this happening depend on details of lower level protocols used by the link itself.

The client application chooses what constitutes "a reasonable amount of time" within which to perform the requested service by specifying that time as the time-out value on the GET it issues for the response.

If the client application itself fails before its GET completes then the outcome is (obviously) not known to the client application itself. Procedures for handling client application failure must take this into account.

An optional component reduces the frequency of exception cases still further, This components works as follows:

When the client application PUTs the request message, the client's queue manager does not transmit the request message to the server application until the client application issues its GET request for the response message. This allows the client's queue manager to respond to the server's queue manager without needing to wait for the client application's GET—i.e. the client application's GET is already waiting for the server application's response.

To summarize, the present invention (in accordance with a preferred embodiment) enables the client application to safely make an assumption that a lack of response from the server application means that the client's request has not and will not be processed. The servers queue manager is able to determine when the client application has not received a response and is able to take appropriate action depending upon the state it is at with regard to processing the client application's initial request.

Thus the following happens such that the server queue manager is able to determine when the client application has not received a response,
i) The server's queue manager prepares the transaction. This means everyone involved (except the client application) is sure they're happy but could still abort if necessary.
ii) The server's queue manger sends an "it worked" response to the client queue manager and waits until the client queue manager reports what happened.
iii) If the client's queue manager reports that the client application got the message, the server queue manager tells everyone involved (except the client) to forward complete the transaction.

If the client's queue manager reports the client application did not get the message, the server queue manager tells everyone involved to abort the transaction.

In this way, a one phase commit resource (the client queue manager) is included as the last participant in a transaction with a two phase commit resource (i.e. the server queue managers transaction).

The transmission of the response from the server queue manager to the client queue manager and the client application's GET are thus included as an additional 1PC component of the server queue manager's 2PC transaction.

That is:
The servers queue manager and the clients queue manager cooperate to create a novel 1PC transaction that does not exist in conventional asynchronous messaging.

Further, the server's queue manager and the client's queue manager cooperate to include this novel 1PC transaction in the server's 2PC transaction.

If the server queue manager does not receive a response from the client queue manager, the servers queue manager could be left waiting for a response indefinitely. Consequently some additional work is done to minimize the server queue managers time "in-doubt".

However, in the final analysis the server queue manager may need to take a guess (i.e. a heuristic outcome). In case the heuristic outcome is incorrect, this is recorded in a way analogous to the WebSphere MQ dead letter queue.

Although it has been mentioned that the client application's GET of the server application's response may be a 1PC resource, this does not have to be the case. The GET can be non-transactional, 1PC transactional, or 2PC transactional—the invention is equally applicable for all three of these possibilities.

However, in the preferred embodiment the 2PC transaction between queue managers and the COMMIT of the client application GET—which are normally entirely separate from each other and from the server queue managers 2PC transaction—are collapsed into a novel 1PC process and then 1PC process is included into the server's 2PC transaction.

It should be appreciated that while the preferred embodiment has been described specifically in terms of queue managers, the invention is not limited to such but is applicable to any communication manager.

A particular advantage of the present invention is that this functionality can be provided without disruption to the client application itself.

The invention claimed is:

1. A method for facilitating communication between a client application and a server application, the method comprising:

responsive to the client application initiating a synchronous communication with the server application by sending a request for processing by the server application via an asynchronous communication manager, performing a plurality of checks to identify a cause of any failure to provide a response to the client application to satisfy synchronous communication criteria, wherein said plurality of checks comprise at least:

checking at a client application queue manager that said client application request is appropriately specified;

checking that a communications link to a server application queue manager is working;

checking that a response is PUT into a transmit queue hosted by said server application queue manager;

checking that a communications link to said client application queue manager is working;

checking that said client application retrieves said server application response from a client application reply-to queue; and checking each of a set of resources and a sequence of resource updates required to provide a response to the client application; and wherein said asynchronous communication manager comprises a said client application queue manager and a said server application queue manager; and using the results of said plurality of checks to determine whether to back out any updates performed in response to the request for processing by the server application so that the server application will not perform any unnecessary processing;

said server application queue manager forwarding said server application response to a client application request for receipt by said client application; and in response to successful delivery of said server application response to said client application, said client application queue manager informing said server application queue manager that it is acceptable to finalize any changes necessitated by said client application request with one or more resources.

2. The method of claim 1, wherein performing said plurality of checks further comprises at least:

checking that a request queue, hosted by said server application queue manger, is able to receive said client application request;

checking that said client application request is retrieved by said server application; and checking that a reply-to queue, hosted by said client application queue manager, is able to receive said server application response.

3. The method of claim 2 comprising:

responsive to determining that said request queue is unable to receive said client application request, creating a notification for administrator attention; and responsive to determining that said client application request is not retrieved by said server application, creating a notification for administrator attention.

4. The method of claim 3 comprising:

said server application queue manager requesting that any resource managers involved in processing said client application request guarantee that they are able to finalize any changes necessitated by said client application's request;

responsive to a resource manager being unable to make such a guarantee, said server application queue manager requesting said resource managers to undo any changes made on behalf of said server application; and responsive to said resource managers being able to make such a guarantee, logging that a response is to be sent to said client application queue manager.

5. The method of claim 4 comprising:

providing said server application with a predetermined amount of time in which to retrieve said client application request from said server application queue manager; and providing said client application with a predetermined amount of time in which to retrieve said server application response from said client application queue manager.

6. The method of claim 5 comprising:

while waiting for an indication from said client application queue manager of successful delivery of said server application response, said server application queue manager checking that said communications link between said client application queue manager and said server application queue manager is working;

responsive to determining that said communications link is not working, finalizing any changes necessitated by said client application request with one or more resources;

providing a notification that an error may have occurred for administrator attention; and using heartbeat technology to determine whether said communications link is working.

7. The method of claim 6, wherein said server application queue manager has failed subsequent to sending a response to said client application request, but prior to confirmation of delivery of said response to said client application, the method comprising:

upon restart of said server application queue manager and responsive to detecting logged information that a response was sent, finalizing any changes necessitated by said client application request with one or more resources;

providing a notification that an error may have occurred for administrator attention; and wherein said server application queue manager has failed prior to sending a response to said client application request, further comprising upon restart of said server application queue manager and responsive to detecting that there is no logged information that a response was sent, requesting that said server application undo any changes necessitated by said request and abort processing.

8. A computer program product for facilitating communication between a client application and a server application, the computer program product comprising:

a computer readable storage medium having computer readable program code embodied therewith, the computer readable program code adapted to perform the method of claim 7 when said program is run on a computer.

9. An apparatus for facilitating communication between a client application and a server application, the apparatus comprising a processor programmed to:

responsive to the client application initiating a synchronous communication with the server application by sending a request for processing by the server application via an asynchronous communication manager, perform a plurality of checks to identify a cause of any failure to provide a response to the client application that satisfies synchronous communication criteria, wherein said plurality of checks comprise at least:

a check at a client application queue manager that said client application request is appropriately specified;

a check to see if a communications link to a server application queue manager is working;

a check to see if a response is PUT into a transmit queue hosted by said server application queue manager;

a check that a communications link to said client application queue manager is working;

a check that said client application retrieves said server application response from a client application reply-to queue; and check each of a set of resources and a sequence of resource updates required to provide a response to the client application;

wherein said asynchronous communication manager comprises a said client application queue manager and a said server application queue manager; and using the results of said plurality of checks to determine whether to back out any updates performed in response to the request for processing by the server application so that the server application will not perform any unnecessary processing;

said server application queue manager forwarding said server application response to a client application request for receipt by said client application; and in response to successful delivery of said server application response to said client application, said client application queue manager informing said server application queue manager that it is acceptable to finalize any changes necessitated by said client application request with one or more resources.

10. The apparatus of claim 9, wherein said plurality of checks further comprises:

a check to see if a request queue, hosted by said server application queue manger, is able to receive said client application request;

a check to see if said client application request is retrieved by said server application; and a check to see if a reply-to queue, hosted by said client application queue manager, is able to receive said server application response.

11. The apparatus of claim 10 wherein said processor is further programmed to:

create a notification for an administrator's attention if it is determined that said request queue is unable to receive said client application request; and create a notification for an administrator's attention if it is determined that said client application request is not retrieved by said server application.

12. The apparatus of claim 11 wherein said processor is further programmed to:

request, at said server application queue manager, that any resource manager involved in processing said client application request, guarantee that they are able to finalize any changes necessitated by said client application request;

if a resource manager is unable to make such a guarantee, a request via said server application queue manager to request said resource managers undo any changes made on behalf of said server application; and log a response to be sent to said client application queue manager that said resource manager is able to make such a guarantee.

13. The apparatus of claim 12 wherein said processor is further programmed to:

provide said server application with a predetermined amount of time in which to retrieve said client application request from said server application queue manager; and provide said client application with a predetermined amount of time in which to retrieve said server application response from said client application queue manager.

14. The apparatus of claim 13 wherein said processor is further programmed to:

check, via said server application queue manager, that said communications link between said client application queue manager and said server application queue manager is working, while waiting for an indication from said client application queue manager of successful delivery of said server application response;

if determined that said communications link is not working, finalize any changes necessitated by said client application request with one or more resources;

provide a notification that an error may have occurred for administrator attention; and determine whether said communications link is working using heartbeat technology.

15. The apparatus of claim 14, wherein said server application queue manager has failed subsequent to sending a response to said client application request, but prior to confirmation of delivery of said response to said client application, wherein said processor is further programmed to:

finalize any changes necessitated by said client application request with one or more resources upon restart of said server application queue manager and responsive to detecting logged information that a response was sent;

provide a notification that an error may have occurred for administrator attention; and wherein said server application queue manager has failed prior to sending a response to said client application request, upon restart of said server application queue manager and responsive to detecting that there is no logged information that a response was sent, request that said server application undo any changes necessitated by said request and abort processing.

16. A method for facilitating communication between a client application and a server application, the method comprising:

responsive to the client application initiating a synchronous communication with the server application by sending a request for processing by the server application via an asynchronous communication manager, said asynchronous communication manager performing a first set and a second set of checks to identify a cause of any failure to provide a server application response to the client application, in order to satisfy synchronous communication criteria;

said first set of checks verifying said client application request reaches a server application queue manager, said first set of checks comprising:

checking at a client application queue manager that said client application request is appropriately specified, including, at least, a client application reply-to queue to accommodate said server application response, and, if not, returning a failed status to said client application;

checking that a communications link to said server application queue manager is working, and, if not, returning a failed status to said client application;

checking that a request queue, hosted by said server application queue manger, is able to receive said client application request, and, if not, deleting said client application request; and checking that said client application request is retrieved by said server application within a configurable amount of time, and, if not, deleting said client application request; and said second set of checks verifying said server application response, if sent, is received at said client application, said second set of checks comprising:

checking that a response is PUT into a transmit queue hosted by said server application queue manager, and, if not, returning a failed status to said server application;

checking that a communications link to said client application queue manager is working, and, if not, returning a failed status to said server application;

checking that said client application queue manager is able to PUT said server application response onto said application reply-to queue, and, if not, returning a failed status to said server queue manager; and checking that said client application retrieves said server application response from said client application reply-to queue, and, if not, returning a failed status to said server queue manager; and using results of said first set and said second set of checks to determine whether the client application will receive a response from said server queue manager or the transaction will be aborted, thus, backing out any updates performed in response to said request for processing by said server application so that said server application will not perform any unnecessary processing.

* * * * *